US011862835B2

(12) United States Patent
Chou et al.

(10) Patent No.: US 11,862,835 B2
(45) Date of Patent: Jan. 2, 2024

(54) DIELECTRIC FILTER WITH MULTILAYER RESONATOR

(71) Applicant: CYNTEC CO., LTD., Hsinchu (TW)

(72) Inventors: Sheng-Ju Chou, Hsinchu (TW); Chen-Chung Liu, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 217 days.

(21) Appl. No.: 17/393,414

(22) Filed: Aug. 4, 2021

(65) Prior Publication Data

US 2022/0052430 A1 Feb. 17, 2022

Related U.S. Application Data

(60) Provisional application No. 63/064,941, filed on Aug. 13, 2020.

(51) Int. Cl.
*H01P 1/205* (2006.01)
*H01P 1/20* (2006.01)
*H01P 3/16* (2006.01)

(52) U.S. Cl.
CPC .......... *H01P 1/2002* (2013.01); *H01P 1/2053* (2013.01); *H01P 3/16* (2013.01)

(58) Field of Classification Search
CPC ........ H01P 1/2002; H01P 1/202; H01P 1/205; H01P 1/2053; H01P 1/2056; H01P 1/2088; H01P 1/20; H01P 1/201; H01P 1/203; H01P 3/16; H01P 3/122; H01P 7/00; H01P 7/04; H01P 7/08; H03H 7/01; H03H 7/0138; H03H 7/0153; H03H 7/0161; H03H 2007/013; H03H 2007/0192
See application file for complete search history.

(56) References Cited

U.S. PATENT DOCUMENTS

| | | | | |
|---|---|---|---|---|
| 2,527,664 A * | 10/1950 | Wheeler | .............. H03H 7/0123 333/202 |
| 5,059,929 A | 10/1991 | Tanaka | |
| 7,705,695 B2 | 4/2010 | Kushta | |
| 8,680,950 B2 | 3/2014 | Taniguchi | |
| 9,627,731 B2 | 4/2017 | Cho | |
| 2003/0128085 A1* | 7/2003 | Gomez | ..................... H01P 1/20 333/204 |
| 2014/0176263 A1* | 6/2014 | Giraudo | ............. H01P 1/20336 333/205 |
| 2021/0159582 A1 | 5/2021 | Ogawa | |

(Continued)

FOREIGN PATENT DOCUMENTS

| | | |
|---|---|---|
| CN | 1989650 A | 6/2007 |
| CN | 112635941 A | 4/2021 |
| EP | 0 324 512 A2 | 7/1989 |

(Continued)

*Primary Examiner* — Stephen E. Jones

(74) *Attorney, Agent, or Firm* — Winston Hsu

(57) ABSTRACT

The present invention discloses a dielectric filter with multilayer resonator, including a dielectric block, a plurality of multilayer resonator formed in the dielectric block, wherein each multilayer resonator is in a column shape extending in a first direction into the dielectric block and is formed of multiple metal layers paralleling and overlapping each other in a second direction, and vias extend in the second direction and connecting the metal layers in each multilayer resonator, and a ground electrode connected to the ground terminal of each multilayer resonator.

21 Claims, 7 Drawing Sheets

(56) References Cited

U.S. PATENT DOCUMENTS

| | | | | |
|---|---|---|---|---|
| 2022/0077553 | A1* | 3/2022 | Jian | H01P 7/08 |
| 2022/0231395 | A1* | 7/2022 | Tada | H01P 7/04 |

FOREIGN PATENT DOCUMENTS

| | | | |
|---|---|---|---|
| JP | 57-136804 | A | 8/1982 |
| JP | 4367660 | B2 | 11/2009 |
| JP | 4983881 | B2 | 7/2012 |
| JP | 2019-220841 | A | 12/2019 |
| KR | 10-2016-0134225 | A | 11/2016 |
| KR | 10-1714483 | B1 | 3/2017 |
| TW | 472444 | | 1/2002 |

* cited by examiner

DIELECTRIC FILTER WITH MULTILAYER RESONATOR

CROSS REFERENCE TO RELATED APPLICATIONS

This application claims the benefit of U.S. Provisional Patent Application No. 63/064,941, filed on Aug. 13, 2020, which is incorporated by reference herein in its entirety.

BACKGROUND OF THE INVENTION

1. Field of the Invention

The present invention relates generally to a dielectric filter, and more specifically, to a dielectric filter with multilayer resonators formed of metal layers extending into a dielectric block.

2. Description of the Related Art

Filters are known to provide attenuation of signals having frequencies outside of a particular frequency range and little attenuation to signals having frequencies within the particular range of interest. As is also known, these filters may be fabricated from ceramic materials having one or more resonators formed therein. A ceramic filter may be constructed to provide a lowpass filter, a bandpass filter, or a highpass filter, for example.

Dielectric filters typically employ quarter-wavelength type resonators with one end electrically open and the other end shorted to ground in combline like design. This design offers compact size and rugged construction in a slim, low-profile component. Moreover, this design offers transmission zeros between pairs of resonators and only requires a printed pattern on one surface of the filter block.

Nevertheless, conventional resonator in dielectric filter is usually designed in column shape, which is formed by filling up or plating preformed cavities in a dielectric block with metal materials. The size and weight of these kinds of conventional resonators are considerably large and heavy, which is not suitable for the application of 5G telecommunication systems that employs Massive MIMO requiring individual filters for each antenna unit.

In addition, conventional dielectric filter is usually manufactured by forming process, which is difficult for mass and customized production. Mechanical hole drilling is required in forming process to form resonant cavities, which is susceptible to the drilling process with low yield and poor uniformity. Also, secondary processing like manual tuning and calibration are also required after forming and drilling since it is difficult to control the accuracy of filling (or plating) process and drilling process. These disadvantages make conventional dielectric filter unsuitable for current 5G application.

SUMMARY OF THE INVENTION

In order to solve the aforementioned disadvantages in prior art and develop a dielectric filter well suited for the 5G application nowadays, the present invention hereby provides a novel dielectric filter, featuring multiple metal layers forming in a dielectric block to constitute the columned resonators with excellent light-weight and miniaturization properties as well as improved yield and excellent uniformity.

The objective of present invention is to provide a dielectric filter with multilayer resonator, including a dielectric block, at least one multilayer resonator formed in the dielectric block, wherein each multilayer resonator is in a column shape extending in a first direction into the dielectric block and is formed of multiple metal layers paralleling and overlapping each other in a second direction perpendicular to the first direction, and each multilayer resonator is provided with a first signal terminal, a second signal terminal and a ground terminal, a plurality of vias extending in the second direction and connecting the metal layers in each multilayer resonator, and a ground electrode connected to the ground terminal of each multilayer resonator in the first direction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

Figure 1:
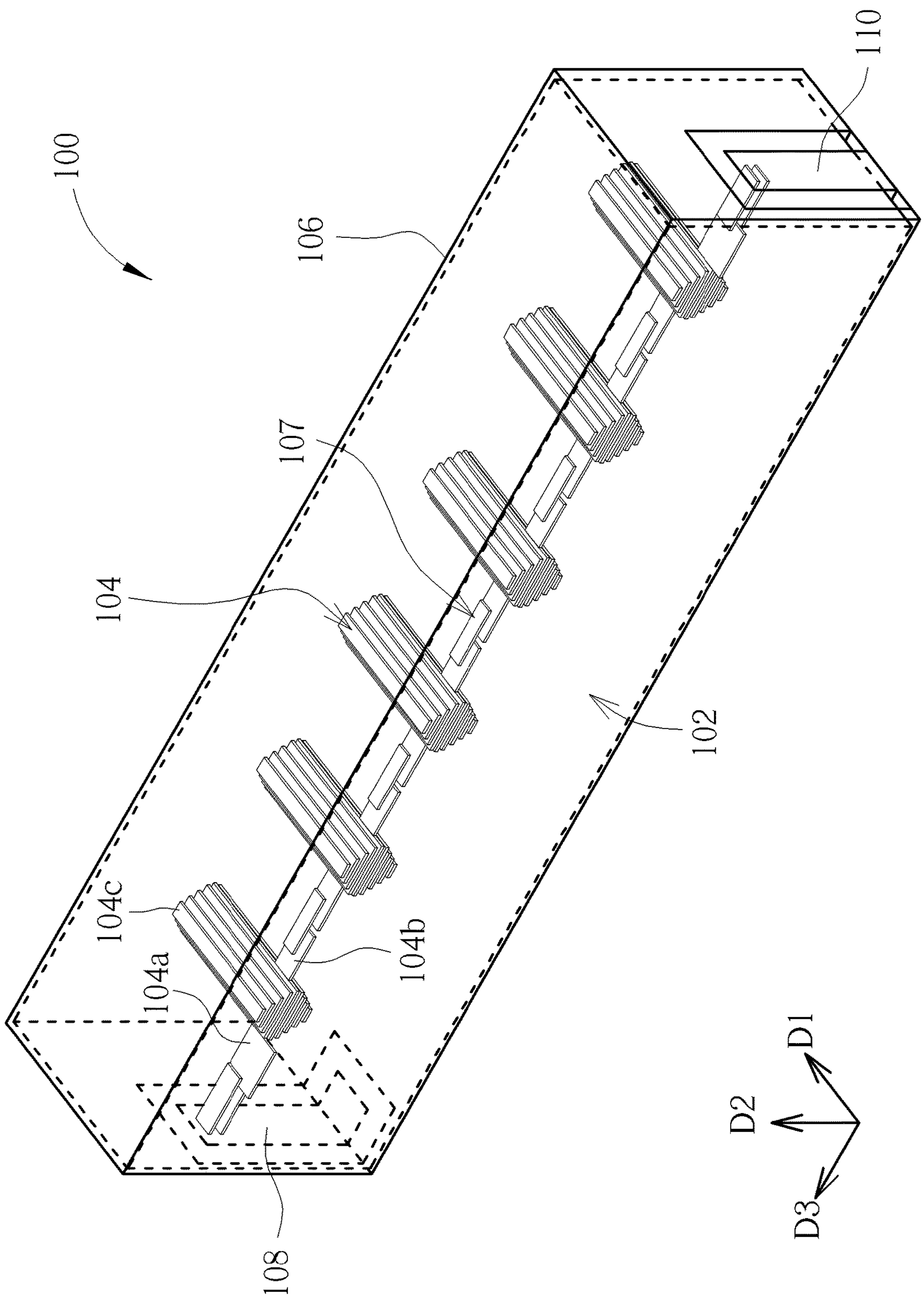
FIG. 1 is a schematic isometric view of the dielectric filter in accordance with the preferred embodiment of present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

In following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Dimensions and proportions of certain parts of the drawings may have been shown exaggerated or reduced in size, for the sake of clarity and convenience in the drawings. Other embodiments may be utilized and structural, logical, and electrical changes may be made without departing from the scope of the present invention. The following detailed description, therefore, is not to be taken in a limiting sense, and the scope of the present invention is defined by the appended claims.

As used in various embodiments of the present disclosure, the expressions “include”, “may include” and other conjugates refer to the existence of a corresponding disclosed function, operation, or constituent element, and do not limit one or more additional functions, operations, or constituent elements. Further, as used in various embodiments of the present disclosure, the terms “include”, “have”, and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Spatially relative terms, such as “beneath,” “below,” “lower,” “above,” “upper,” and the like, may be used herein for ease of description to describe one element or feature’s relationship to another element(s) or feature(s) as illustrated in the figures. It should be readily understood that these meanings such as “on,” “above,” and “over” in the present disclosure should be interpreted in the broadest manner such that “on” not only means “directly on” something but also includes the meaning of “on” something with an intermediate feature or a layer therebetween, and that “above” or “over” not only means the meaning of “above” or “over” something but can also include the meaning it is “above” or “over” something with no intermediate feature or layer therebetween (i.e., directly on something).

While expressions including ordinal numbers, such as “first” and “second”, as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that an element is “coupled” or “connected” to another element, the first element may be directly coupled or connected to the second element, and a third element may be “coupled” or “connected” between the first and second elements. Conversely, when one component element is “directly coupled” or “directly connected” to another component element, it may be construed that a third component element does not exist between the first component element and the second component element.

Figure 2:
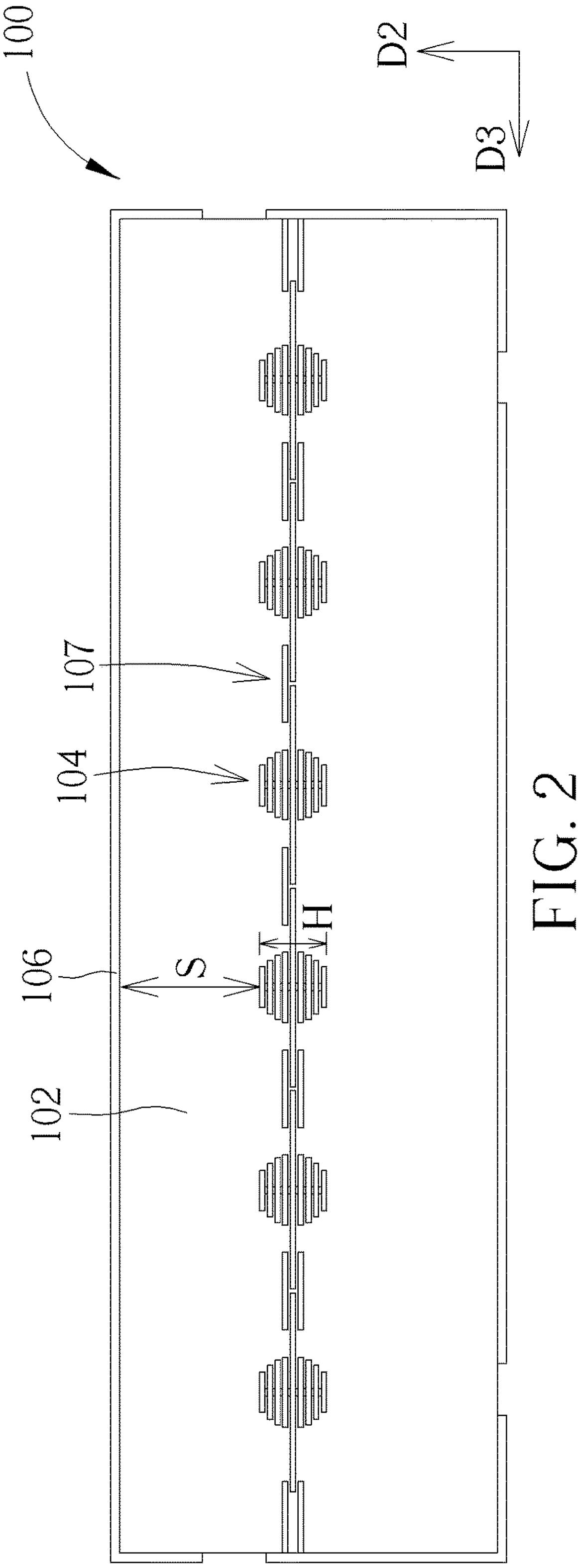
FIG. 2 is a cross-sectional view of the dielectric filter in the first direction in accordance with the preferred embodiment of present invention.
Figure 3:
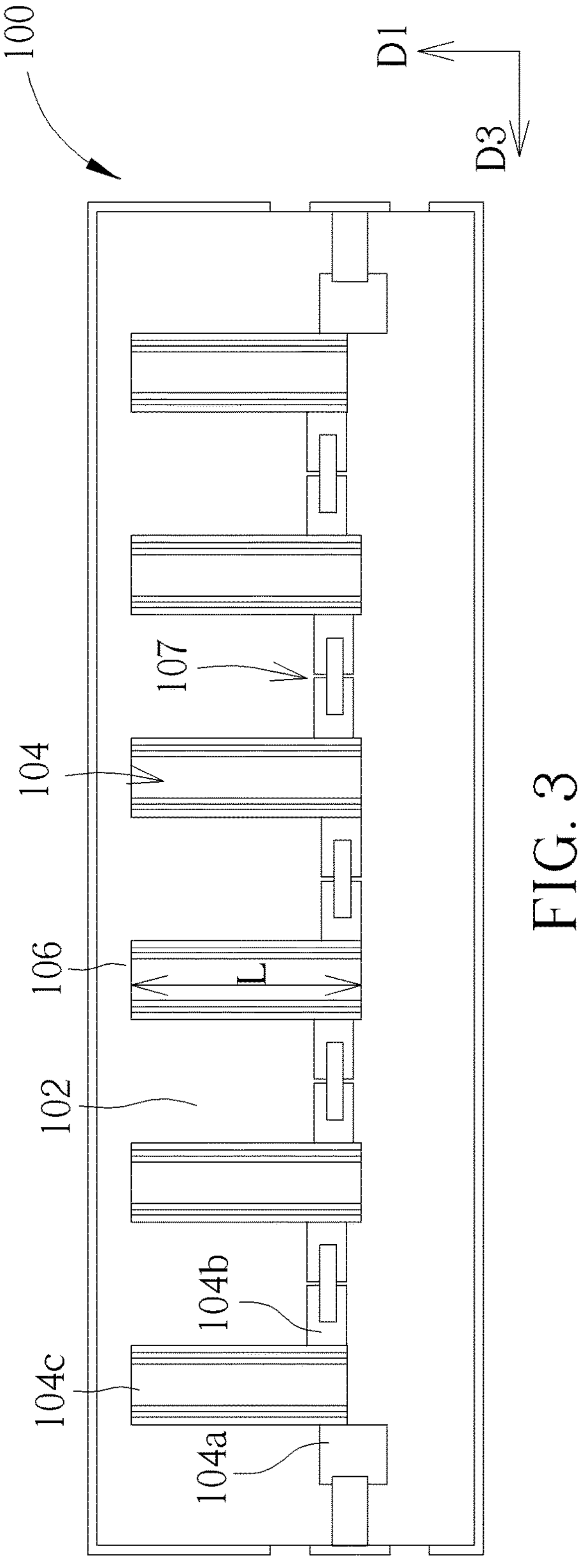
FIG. 3 is a cross-sectional view of the dielectric filter in the second direction in accordance with the preferred embodiment of present invention.

Firstly, please refer collectively to FIGS. 1-3, which are the schematic isometric view, cross-sectional view in a first direction D1 and cross-sectional view in a second direction D2 of a combline filter respectively in accordance with the preferred embodiment of present invention. The filter 100 of present invention includes a dielectric block 102 as the main body. As shown in FIG. 1, the dielectric block 102 is preferably a low-profile rectangular cuboid bounded by six quadrilateral faces and with its length, depth and height extending respectively in a third direction D3, the first direction D1 and the second direction D2, wherein the first, second and third directions D1, D2, D3 are preferably perpendicular to each other. The material of dielectric block 102 may be ceramic, such as BaSmTi, ZrTiSn or MgSi with loss tangent ranging from $10^{-4}$ to $10^{-5}$. In comparison to common FR4 material used in PCB with loss tangent of $10^{-3}$, these materials are more suitable for high-frequency and high-rejection bandpass filter required in the application of 5G telecommunication. It should be note that the present invention may also be implemented using PCB process.

Refer still to FIGS. 1-3. A series of multilayer resonators 104 are formed in the dielectric block 102. In the present invention, the multilayer resonators 104 are preferably aligned and closely spaced in the third direction D3 in the dielectric block 102. The multilayer resonator 104 may be a transverse electromagnetic resonator in a column shape extending in the first direction D1 into the dielectric block 102. One end of the columned multilayer resonator 104 is electrically opened inside the dielectric block 102 and the other end of the columned multilayer resonator 104 is shorted to a ground electrode 106. In the present invention, the ground electrode 106 may be a metallic shielding cladding or soldering on the outer surface of the dielectric block 102 to minimize the noise coupling and to achieve acceptable stopbands and satisfactory harmonic performance. The multilayer resonators 104 in the dielectric block 102 connect the ground electrode 106 at the surface of dielectric block 102 through its ground terminal **104*c* at rear end. The ground terminal 104*c* may be electrically connected with the ground electrode 106 through ground structures (not shown) like ground path or ground layer. Alternatively, in some embodiments, the ground terminal 104*c* of the multilayer resonator 104 may not extend outside of the dielectric block 102. The material of ground electrode 106 may be the conductive material including but not limited to aluminum, steel, copper, silver and nickel, as well as metal alloys. During use, wireless/microwave signals enter the filter shielding and follow a signal pathway around/through the multilayer resonators 104**. Depending on the position and configuration of the resonators, the frequency response of the filter can be tailored to suit specific operational needs.

Refer still to FIGS. 1-3. In the preferred embodiment of present invention, the multilayer resonators 104 are capacitively coupled with each other in series through capacitors 107 set between the multilayer resonators 104. Alternatively, in other embodiment, the multilayer resonators 104 may be directly connected with each other in series through the metal layers extending from and between the multilayer resonators 104. More specifically, in the embodiment of present invention, each multilayer resonator 104 has a first signal terminal **104*a* and a second signal terminal 104*b* at two lateral ends respectively. The first signal terminal 104*a* of one multilayer resonator 104 and the second signal terminal 104*b* of an adjacent multilayer resonator 104 may be directly connected through a metal layer or capacitively coupled through capacitor or inductively coupled through inductor. The resonance characteristic of LC or RLC is provided between the first signal terminal 104*a* and the second signal terminal 104*b*. The bandwidth and response of the filter is determined by the amount of coupling of each multilayer resonator 104 to its immediate neighbor, which in turn is dependent on resonator size, resonator spacing, and ground plane separation. Furthermore, a first signal electrode 108 and a second signal electrode 110 are set respectively at opposite sides of the dielectric block 102 in the third direction D3. In the preferred embodiment of present invention, the first signal electrode 108 may be an input pad and the second signal electrode 110 may be an output pad to input and output the signals to be filtered and resonated by the filter 100. Similarly, the first signal electrode 108 and the second signal electrode 110 may be directly connected or capacitively or inductively coupled to the first signal terminal 104***a* or second signal terminal 104*b* of the multilayer resonators 104 through metal layers or capacitors. In combline filter, the first signal (input) electrode 108 is coupled to the first signal terminal 104*a* of the first multilayer resonators 104 on one side of the dielectric block 102 and the second signal electrode 110 is coupled to the second signal terminal 104*b* of the last multilayer resonators 104 on the other side of the dielectric block 102 in the series. The first signal electrode 108 and the second signal electrode 110 may be further electrically connected to external PCB or devices to receive and transmit signals. Please note that the first signal electrode 108 and the second signal electrode 110 are not electrically connected with the ground terminal (shielding) 106 although they are all set on outer surfaces of the dielectric block 102.

Please refer to FIG. 2. In the embodiment of present invention, the ratio of a total height H of the multilayer resonator 104 in the second direction D2 and a spacing S between the multilayer resonator 104 and an outer surface of the dielectric block 102 (shielded by the ground electrode 106 like a ground structure) in the second direction D2 is preferred 1:1 to 1:2 (H:S), in order to achieve an optimal filtration efficiency. In addition, please refer to FIG. 3, the length L of multilayer resonators 104 in the first direction D1 is preferably and nominally λ/4 at the centre frequency, wherein λ is the wavelength of the signal.

Figure 4:
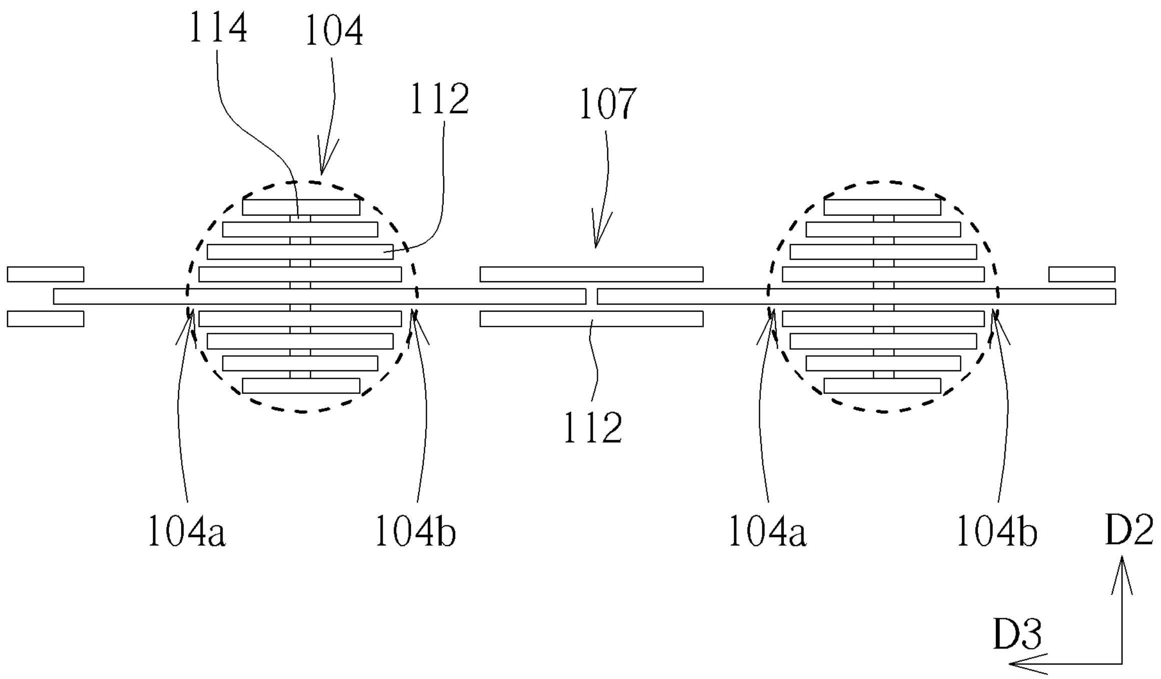
FIG. 4 is an enlarged cross-sectional view of the multilayer resonators in the first direction in accordance with the preferred embodiment of present invention.

Now, please refer to FIG. 4, which is an enlarged cross-sectional view of the multilayer resonator 104 in the preferred embodiment of present invention. The multilayer resonator 104 of the present invention is particularly constituted by multiple metal layers 112. As shown in the figure, the metal layers 112 preferably parallel and overlap each other in the second direction D2, which is perpendicular to the first direction D1 in which the multilayer resonator 104 extends. The metal layers 112 may have the same length in the first direction D1, however, their width in the third direction D3 may be different in order to render required cross-sectional shape for the multilayer resonator 104. Take the circular cross-sectional shape in the figure for example, the metal layer 112 has a width different in the third direction D3 from the widths of adjacent metal layers. The percentage difference of lengths in the first direction D1 of adjacent metal layers 112 in each multilayer resonator 104 may be 0%~15%, and the multilayer resonator 104 is preferably constituted by at least six metal layers 112 in order to provide good resonant efficiency. The first signal terminal 104*a* and the second signal terminal 104*b* of a multilayer resonator 104 may be two ends of a metal layer 112, especially the metal layer 112 with max width in the third direction D3 in a multilayer resonator 104.

Figure 6:
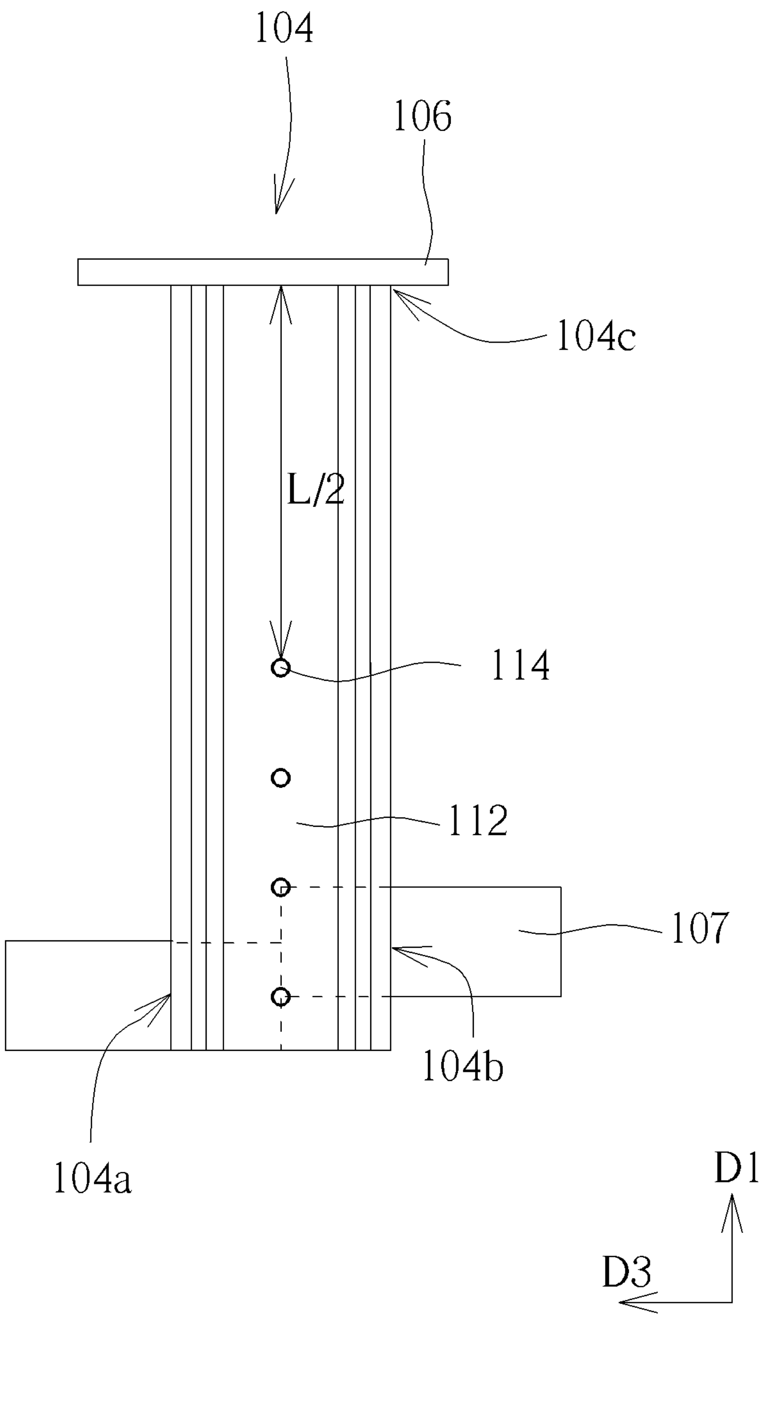
FIG. 6 is an enlarged cross-sectional view of the multilayer resonator in the second direction in accordance with the preferred embodiment of present invention.

In addition, as shown in FIG. 4, a straight via 114 is formed extending in the second direction D2 from a topmost metal layer 112 to a bottommost metal layer 112 in each multilayer resonator 104. The via 114 electrically connects every metal layers 112 in the multilayer resonator 104 so that these metal layers 112 may constitute and function in entirety like a normal cylindrical resonator. The via 114 is preferably formed in the middle of the multilayer resonator 104 in the width direction (third direction D3), that is, aligning with a vertical diameter of the circular multilayer resonator 104. In some embodiments, a via 114 in a multilayer resonator 104 may be divided into several via sections (not shown) offset each other in the third direction D3 and connecting all of the metal layer 112 in the multilayer resonator 104 (i.e. the metal layers 112 are not connected by a single, straight via). The via sections connecting three adjacent metal layers may have overlapping portions in the second direction D2. Moreover, please refer to FIG. 6, a multilayer resonator 104 may include a plurality of vias 114, wherein these vias 114 are preferably aligned and spaced apart in the first (length) direction D1 to provide better resonant efficiency. Also, in order to improve manufacturing yield, these vias 114 are preferably set at a position at least half length of the multilayer resonator 104 in the first direction D1 away from the ground electrode 106 or ground terminal 104*c* (i.e. the ground-shorted end). In some embodiments, these vias 114 may be set along the whole length in the first direction D1 with the same spacing to achieve better characteristics. For the same reason, as shown in the figure, the capacitors 107 or metal layers coupling or connecting the first or second signal terminals 104*a*, 104*b* of the multilayer resonators 104 are preferably set at the open-circuited end of the multilayer structures 104, and the via 114 may be set at a position on 50%~60% width of the multilayer resonator 104 in the third direction D3, preferably the position on 50% width (i.e. middle position).

Please refer back to FIG. 4. In the embodiment of present invention, the capacitor 107 between multilayer resonators 104 may also be constituted by the metal layers 112. As shown in the figure, the capacitor 107 between the two multilayer resonators 104 is constituted by three metal layers 112, wherein some of these metal layers 112 may be a part of metal layers 112 extending from the multilayer resonators 104 (especially the metal layer for providing the first signal terminal 104*a* and the second signal terminal 104*b*). In other embodiment, the two multilayer resonators 104 may be directly connected through common metal layers with the first signal terminal 104*a* and the second signal terminal 104*b* rather than capacitively coupled by the capacitor 107. In the present invention, the material of metal layers 112 may be the conductive material including but not limited to aluminum, steel, silver, copper and nickel, as well as metal alloys.

Figure 5:
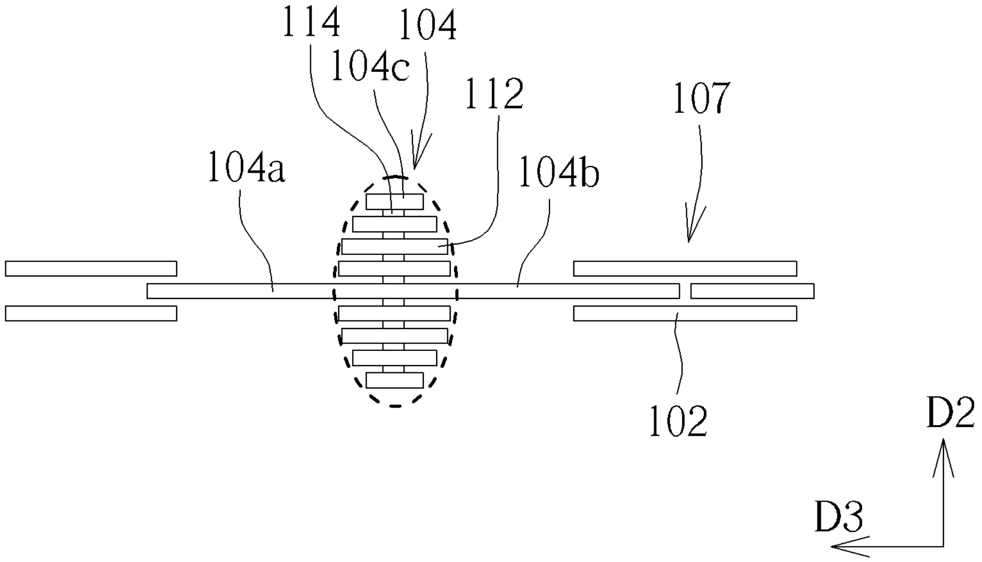
FIG. 5 is an enlarged cross-sectional view of the multilayer resonator in the first direction in accordance with another embodiment of present invention.

In addition, the cross-sectional shape of the multilayer resonators 104 is preferably but not limited to circular. For example, in other embodiments as shown in FIG. 5, the cross-sectional shape of the multilayer resonator 104 is oval constituted by the metal layers 112 with different widths in the third direction D3. In fact, any regular shape such as rectangle or polygon in bilateral symmetry is well suited for the multilayer resonators 104 in the present invention.

In the present invention, the multilayer resonators 104 formed of multiple metal layers 112 in the dielectric block 102 may be realized by using PCB (printed circuit board) process or LTCC (low temperature co-fired ceramics) process. In comparison to conventional forming process that the resonators are formed by filling up or plating inner surface of the drilled resonant cavities in the dielectric block with metal materials, the components of resonators in the present invention, including metal layers 112 and vias 114, may be formed and patterned layer by layer through image transfer and screen printing on multiple thin green tapes in LTCC process. The entire dielectric block 102 is formed by sintering laminated green tapes having patterns of the resonators formed therein. The advantage of this approach is that it can easily manufacture the resonators in complex and customized patterns or shapes with great accuracy. No secondary processing or machining like manual tuning and calibration are required after the resonators are formed. Furthermore, the concept of constituting a resonator through multiple metal layers makes it possible to reduce the weight and scale the size of whole dielectric filter, thereby making it well suited for the application of 5G telecommunication systems that employs Massive MIMO requiring individual filters for compact antenna units.

Figure 7:
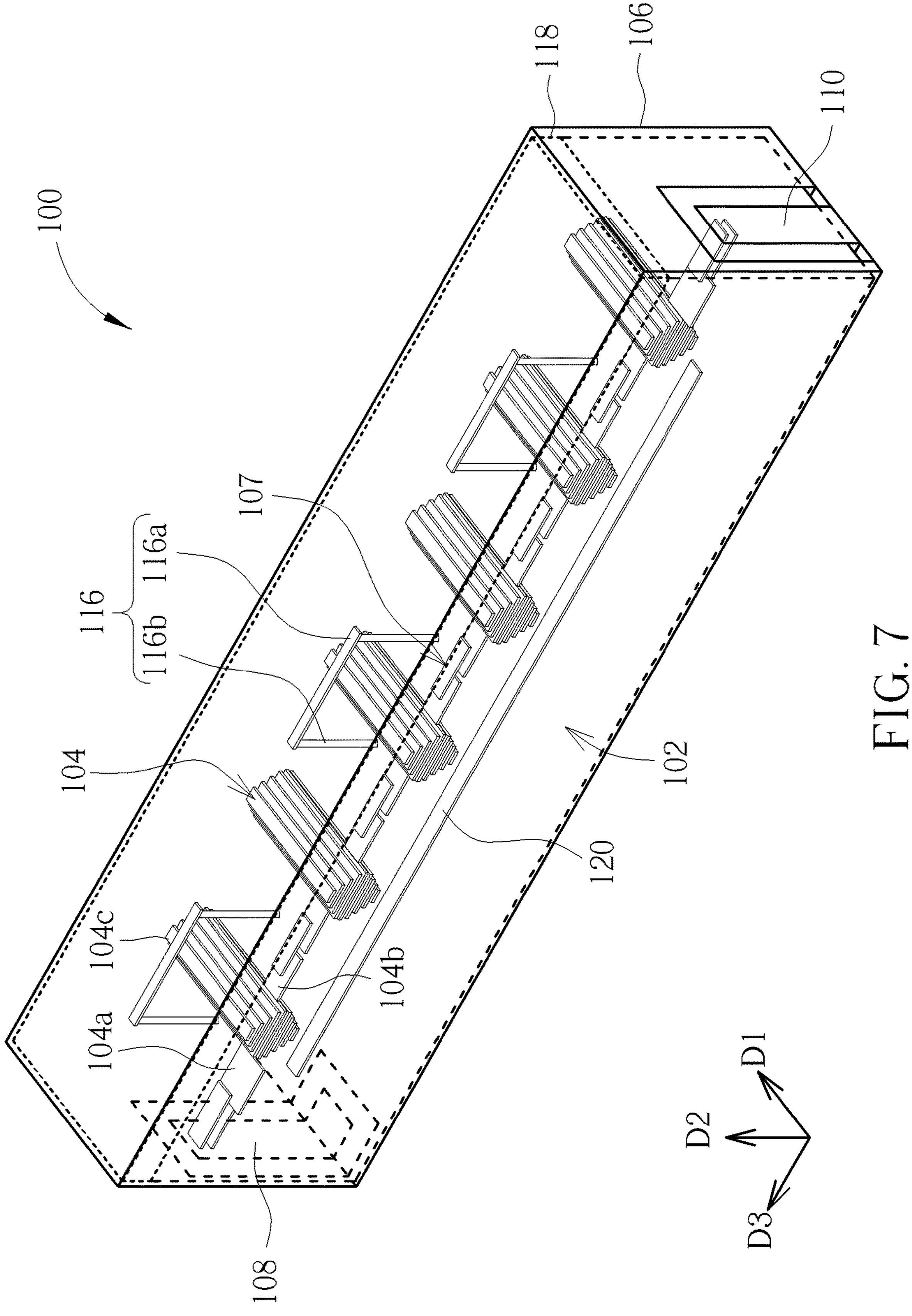
FIG. 7 is a schematic isometric view of the dielectric filter in accordance with another embodiment of present invention.
Figure 8:
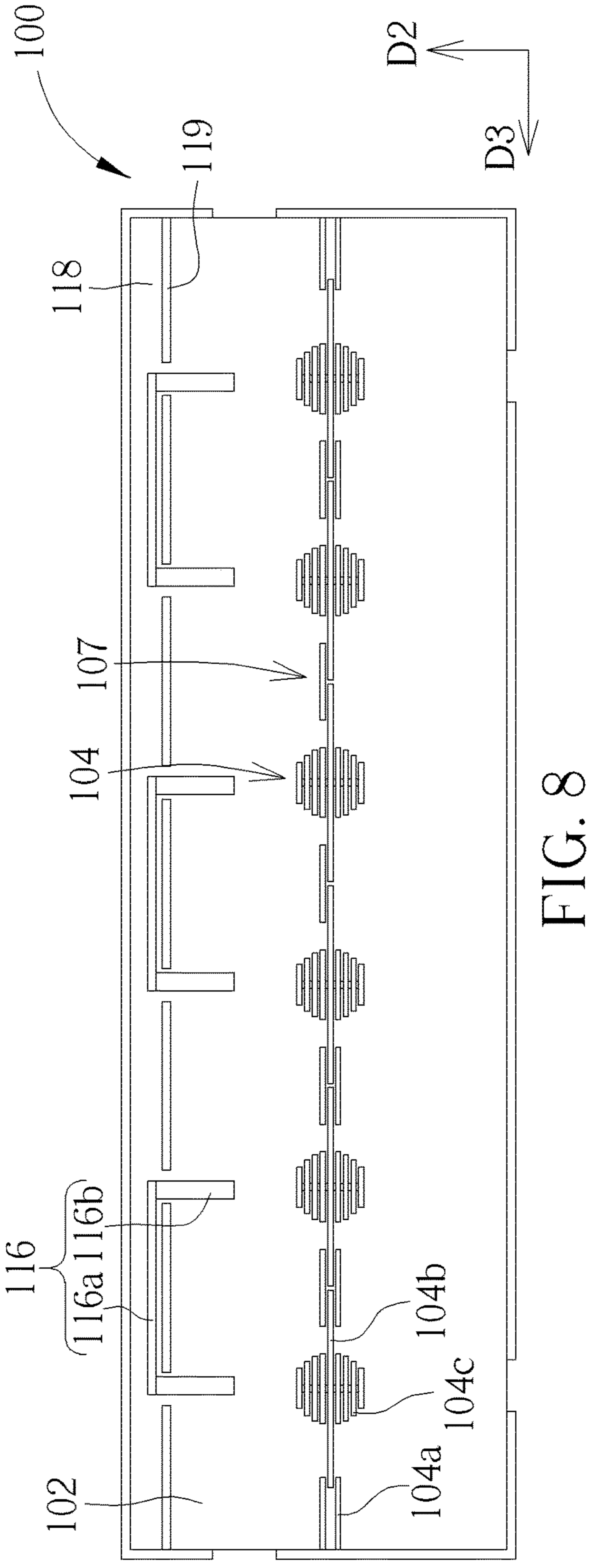
FIG. 8 is a cross-sectional view of the dielectric filter in the first direction in accordance with another embodiment of present invention.
Figure 9:
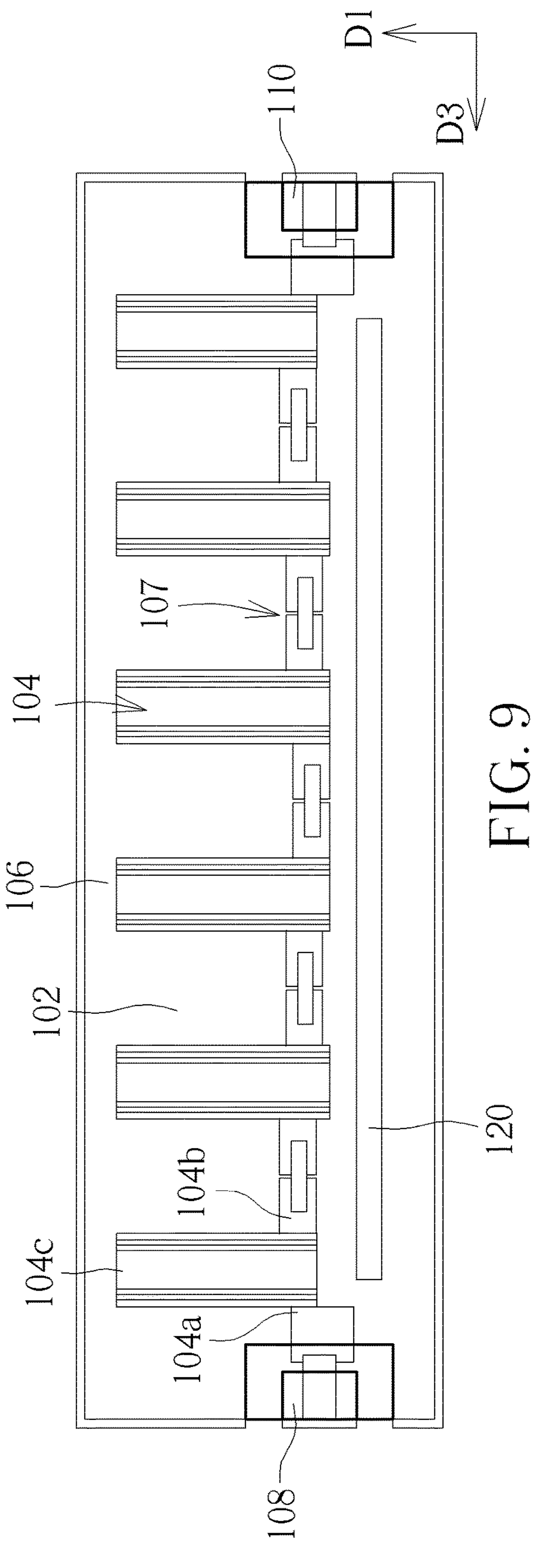
FIG. 9 is a cross-sectional view of the dielectric filter in the second direction in accordance with another embodiment of present invention.

Next, please refer collectively to FIGS. 7-9, which are respectively the schematic isometric view, cross-sectional view in the first direction D1 and cross-sectional view in the second direction D2 of a combline filter in accordance with another embodiment of present invention. In this embodiment, coupling structures are added in the filter 100 to enhance or tuning the coupling degree between the multilayer resonators 104. As shown in the figure, a coupling structure 116 is formed above (or below) every two of the multilayer resonators 104, wherein each of the coupling structures 116 consists of a short metal bar 116*a* formed in an additional dielectric layer 118 on the dielectric block 102 and two coupling vias 116*b* connecting two end of the metal bar 116*a* and extending in the second direction D2 into the dielectric block 102 toward the corresponding two multilayer resonators 104. Please refer to FIG. 8. The dielectric layer 118 may be a part of the dielectric block 102, with a ground layer 119 set therebetween to isolate the metal bar 116*a* and the dielectric block 10. The material of dielectric layer 118 may be the same or different from the material of dielectric block 102. Furthermore, the two coupling vias 116*b* of the coupling structure 116 may extend and pass in the second direction D2 through the holes on the ground layer 119 toward the multilayer resonators 104. Preferably, the coupling via 116*b* is set right above or below the vias 114 that connects the metal layers in the multilayer resonator 104, especially the via 114 closest to the open-circuited end of the multilayer resonator 104.

In addition to the coupling structures 116, please refer still to FIGS. 7-9, a coupling metal bar 120 may be formed below (or above) the multilayer resonators 104 in the dielectric block 102. Unlike the coupling structure 116 that couples only two multilayer resonators 104, the coupling metal bar 120 extends in the third direction D3 over at least two or all multilayer resonators 104 and couples them collectively. Preferably, the coupling metal bar 120 is set behind or not overlapping the multilayer resonators 104 in the first direction D1 or in the second direction D2 as shown in FIG. 9.

Figure 10:
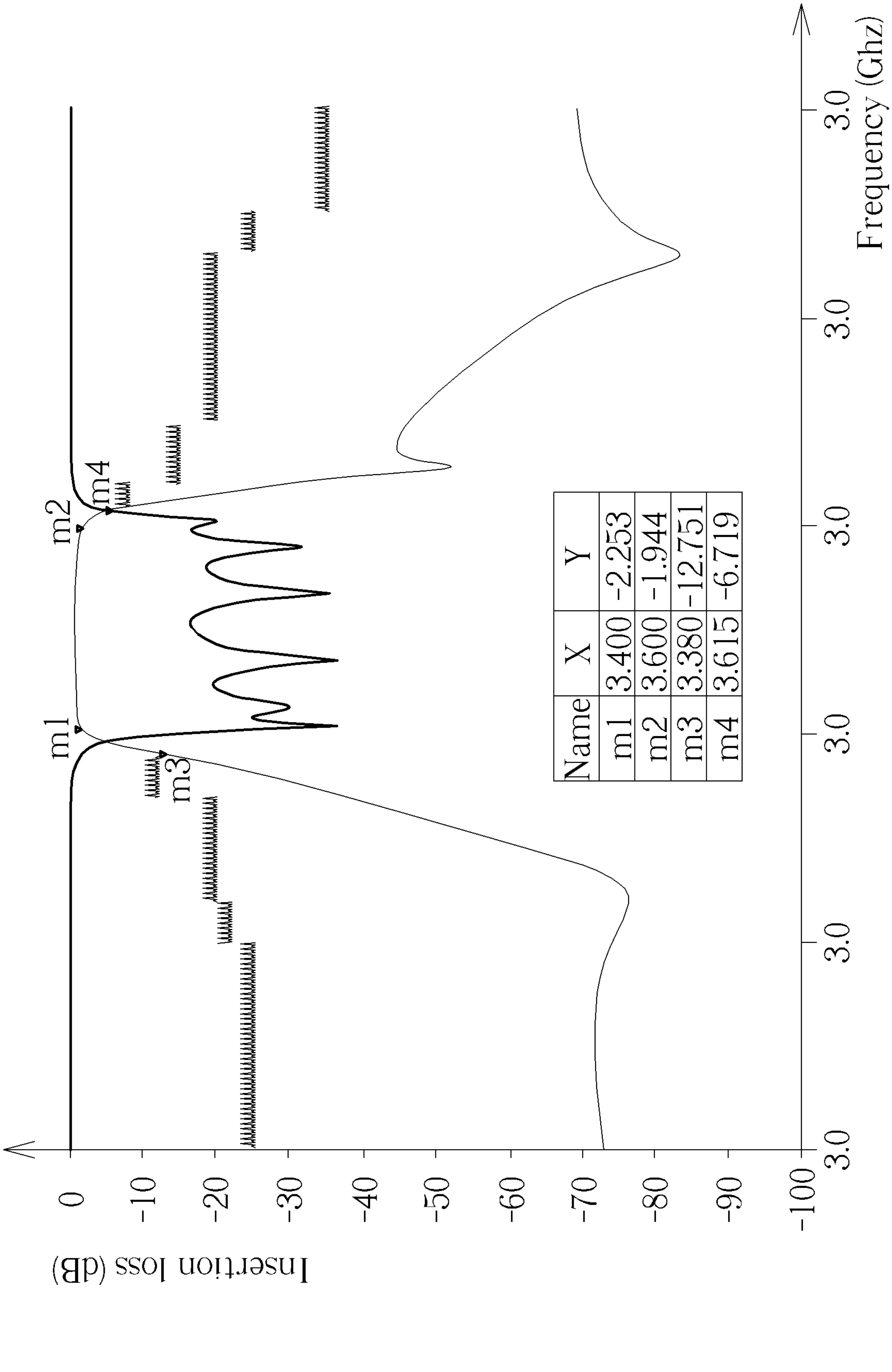
FIG. 10 is s a frequency response graph for the dielectric filter in accordance with the preferred embodiment of present invention.

Lastly, please refer to FIG. 10, which is a frequency response curves for the combline dielectric filter 100 of the present invention. A frequency response is provided having frequency measured in gigahertz (GHz) along the x-axis between 3 GHz and 4 GHz. Insertion/Return loss, measured in dB, is provided along the y-axis and ranges between 0 and −100 along the area of interest. As shown in the figure, the graph reveals that a viable filter response for a high rejection dielectric filter may be achieved in the frequency range of interest. At 5G frequencies, for example, a bandwidth of about 3.5 GHz is realized. The graph also shows reasonable insertion loss values and good stopbands.

According to the embodiments described above, the present invention provides a novel combline dielectric filter with enhanced high rejection and excellent selectivity in the filter's frequency response. The dielectric filter may offer greater design freedom and options to produce custom filters with unique specification requirements, and the accuracy of the dielectric filter may be well-controlled to provide improved yield and excellent uniformity since it is not formed by conventional mechanical drilling method. The present invention is particularly well suited for 5G wireless telecommunications field involving equipment that operates at higher and higher frequencies and which requires filters that are smaller in volume, contain less material, have smaller footprints, and have a lower profile on the circuit board, while still providing high performance and meeting increasingly strict specifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dielectric filter with multilayer resonator, comprising:

a dielectric block;

at least one multilayer resonator formed in said dielectric block, wherein each said multilayer resonator is in a column shape extending in a first direction into said dielectric block and is formed of multiple metal layers paralleling and overlapping each other in a second direction perpendicular to said first direction, and each said multilayer resonator is provided with a first signal terminal, a second signal terminal and a ground terminal;

at least two groups of vias extending in said second direction and connecting said metal layers in each said multilayer resonator, wherein said vias of each said group in each said multilayer resonator are connected to each other and every said group of said vias in each said multilayer resonator are spaced apart in said first direction; and a ground electrode, wherein said ground terminal of each said multilayer resonator extends in said first direction to a side of said dielectric block and connected with said ground electrode.

2. The dielectric filter with multilayer resonator of claim 1, wherein a first signal terminal of one said multilayer resonator and a second signal terminal of one adjacent said multilayer resonator are directly connected with each other in series through metal layers extending between said multilayer resonators.

3. The dielectric filter with multilayer resonator of claim 1, wherein a first signal terminal of one said multilayer resonator and a second signal terminal of one adjacent said multilayer resonator are capacitively or inductively coupled with each other in series through capacitor or inductor between said multilayer resonators, and said capacitors are formed of metal layers between said multilayer resonators.

4. The dielectric filter with multilayer resonator of claim 1, wherein said multilayer resonators are aligned in a third direction perpendicular to said first direction and said second direction.

5. The dielectric filter with multilayer resonator of claim 4, further comprising a coupling metal bar formed above or below said multilayer resonators in said dielectric block, wherein said coupling metal bar extends in said third direction over a plurality of said multilayer resonators.

6. The dielectric filter with multilayer resonator of claim 4, further comprising coupling structures formed above or below every two of said multilayer resonators, wherein each of said coupling structures comprises a metal bar formed in a dielectric layer and two coupling vias connecting two ends of said metal bar and extending in said second direction into said dielectric block toward corresponding two of said multilayer resonators.

7. The dielectric filter with multilayer resonator of claim 6, wherein said dielectric layer is isolated from said dielectric block by a ground layer.

8. The dielectric filter with multilayer resonator of claim 4, wherein said vias are set at a position on 50%~60% width of said multilayer resonator in said third direction.

9. The dielectric filter with multilayer resonator of claim 8, wherein said vias are set at a position on 50% width of said multilayer resonator in said third direction, and a third direction is perpendicular to said first direction and said second direction, and widths in said third direction of said metal layers at two outermost sides in said second direction of said multiple metal layers are smaller than widths in said third direction of other said metal layers.

10. The dielectric filter with multilayer resonator of claim 1, wherein a percentage difference of lengths of said metal layers in said first direction in each said multilayer resonator is 0%~15%.

11. The dielectric filter with multilayer resonator of claim 1, wherein said vias of each said group in each said multilayer resonator are aligned in said second direction.

12. The dielectric filter with multilayer resonator of claim 1, wherein a cross-section of said multilayer resonator in said first direction is in a regular shape including circle, oval or polygon.

13. The dielectric filter with multilayer resonator of claim 12, wherein said cross-section is bilaterally symmetrical.

14. The dielectric filter with multilayer resonator of claim 1, wherein said ground electrode is a shielding attaching on an outer surface of said dielectric block, and said first signal terminal and said second signal terminal of each said multilayer resonator are set at one end of said multilayer resonator, and said ground terminal is set at another end of said multilayer resonator opposite to said end.

15. The dielectric filter with multilayer resonator of claim 14, wherein said ground terminal of said multilayer resonator extends in said first direction to said outer surface to connect with said ground terminal.

16. The dielectric filter with multilayer resonator of claim 14, wherein a ratio of a total height of said multilayer resonator in said second direction and a spacing between said multilayer resonator and a ground structure in said second direction is 1:1 to 1:2.

17. The dielectric filter with multilayer resonator of claim 1, wherein said via is a straight structure extending in said second direction from a topmost said metal layer to a bottommost said metal layer of each said multilayer resonator.

18. The dielectric filter with multilayer resonator of claim 1, wherein said via is set only at a position at least half length of said multilayer resonator in said first direction away from said ground terminal.

19. The dielectric filter with multilayer resonator of claim 1, wherein a length of every said metal layer in said first direction is the same.

20. The dielectric filter with multilayer resonator of claim 1, wherein each of said multilayer resonators is formed of at least six said metal layers.

21. The dielectric filter with multilayer resonator of claim 1, wherein a material of said dielectric block is ceramic, and said multilayer resonator are formed by low temperature co-fired ceramics (LTCC) process.

* * * * *